United States Patent [19]

Hashimoto

[11] 4,069,397
[45] Jan. 17, 1978

[54] AUTOMATIC TELEPHONE ANSWERING DEVICE

[75] Inventor: Kazuo Hashimoto, Tokyo, Japan

[73] Assignee: Hashimoto Corporation Kabushiki Kaisha, Tokyo, Japan

[21] Appl. No.: 669,457

[22] Filed: Mar. 22, 1976

[51] Int. Cl.² .......................................... H04M 11/02
[52] U.S. Cl. .................................................. 179/6 R
[58] Field of Search ............................ 179/6 R, 6 AC

[56] References Cited

U.S. PATENT DOCUMENTS

| | | | |
|---|---|---|---|
| 3,133,992 | 5/1964 | Dickman | 179/6 R |
| 3,784,721 | 1/1974 | Kilby | 179/6 R |
| 3,887,773 | 6/1975 | Urayama | 179/6 R |

FOREIGN PATENT DOCUMENTS 43-15530  6/1968  Japan ..................... 179/6 R

*Primary Examiner*—John H. Wolff
*Attorney, Agent, or Firm*—Haseltine, Lake & Waters

[57] ABSTRACT

In an automatic telephone answering device, answering messages or signals recorded on a memorizing element are transmitted with a pause interval therebetween so as to allow a calling party to talk. An actuator is provided in a blank portion of the tape to energize a timer circuit for operating a loudspeaker for only 3 to 4 seconds to reproduce the voice of the calling party, so that a called party hearing the voice can recognize who the calling party is without picking up the hand-set of the telephone set.

10 Claims, 2 Drawing Figures

AUTOMATIC TELEPHONE ANSWERING DEVICE

BACKGROUND OF THE INVENTION

This invention relates to automatic telephone answering devices, and more particularly their improvement.

Heretofore, conventional automatic telephone answering devices with an answering magnetic tape for answering calls and a receiving magnetic tape for recording the messages of a calling party have been operated in two modes. One of the two methods is a so-called "simultaneous method" or "conversational method" in which both tapes are kept driven to answer a calling party and to record the message of the calling party, respectively. More specifically, answering terms have been recorded in the answering tape intermittently, or with a pause interval therebetween in advance, and the message of the calling party is recorded in the receiving tape during the pause intervals. The other is a so-called "sequential method" in which answering terms each lasting, for instance, for 20 seconds have been recorded in the answering tape in advance, and when each answering term has been transmitted to the calling party, and driving of the answering tape is suspended, so that the message of the calling party is recorded in the receiving tape for a predetermined period of time, or it is recorded in the same by means of a voice-operated switch or the like as long as the message lasts.

An automatic telephone answering and recording device operated in the simultaneous method has been disclosed by Japanese Pat. No. 532850 issued to the applicant. This device has an answering magnetic tape in which answering terms are recorded in a conversational mode. More specifically, the first answering term "Hello, this is Hashimoto Corporation. Who is this, please?" is recorded first in the answering tape, and after a pause interval of 5 - 6 seconds the second answering term "Sorry, there is no one here. Therefore we would like to record your message," is recorded, and after a pause of about 30 seconds the final answering term "Thank you" is recorded. The answering tape and the receiving tape are simultaneously driven when a calling signal reaches the telephone set connected to the automatic telephone answering device, as was described above. When the answering tape comes to its end, the driving of both tapes is suspended.

Accordingly, in the above-described automatic telephone answering device, the name of a called party is first transmitted to the calling party, and then the calling party's name or voice may be transmitted to the called party. Therefore, the called party can talk over the telephone after screening who the caller is, that is, he can select telephone calls necessary for him among a number of telephone calls, which leads to the saving of his time and also to the protection of his privacy.

However, in such conventional systems, in order to recognize who the calling party is when the telephone set rings, it is necessary for the called party to listen to the telephone by picking up the handset secretly, or if the called party is afraid that this listening is detected by the calling party, it is necessary to screen who the calling party is by the use of an amplifier. Furthermore, if this screening is performed by the use of an earphone, the called party will be bound to the telephone set with the automatic answering device for the period of time; and if it is conducted by the use of a loudspeaker, the sound from the loudspeaker may disturb the sleep or work of persons in the vicinity of the loudspeaker.

SUMMARY OF THE INVENTION

An object of this invention is to improve the abovedescribed automatic telephone answering device.

More specifically, an object of the present invention is to provide a method of operating an automatic telephone answering device in which the voice of a calling party or a signal transmitted by him is reproduced through a loudspeaker circuit for three - four seconds during the timer's time corresponding to a pause interval, so as to allow a person hearing the signal to recognize who the calling party is.

Another object of the invention is to provide an automatic telephone answering device in which an answering tape recorded with answering terms is provided with actuating means at its portion where the first answering term is ended, so as to operate a loudspeaker circuit for a certain period of time determined by a timer to reproduce the voice of a calling party.

A further object of the invention is to provide an automatic telephone answering device which comprises notifying means for giving notice of a call from an authorized person.

The foregoing objects and others of this invention will become more apparent from the following detailed description and the appended claims, when read in conjunction with the accompanying drawings in which like parts are designated by like reference characters.

BRIEF DESCRIPTION OF THE ACCOMPANYING DRAWINGS

In the accompanying drawings:

FIG. 1 is a block diagram illustrating a first example of an automatic telephone answering device according to this invention, and FIG. 2 is also a block diagram illustrating a seond example of the automatic telephone answering device according to the invention.

DETAILED DESCRIPTION OF THE INVENTION

Figure 1:
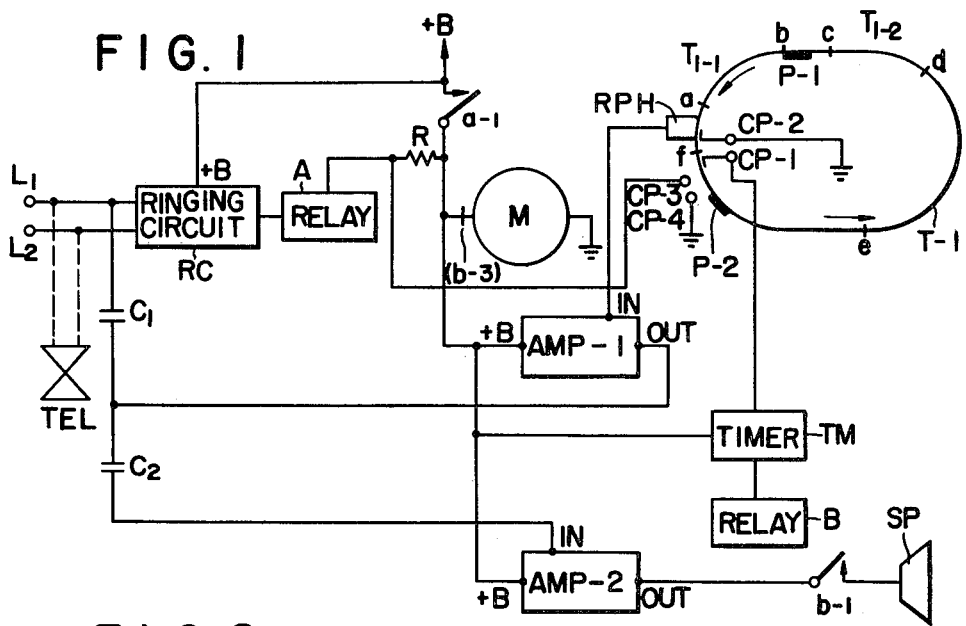

A first example of an automatic telephone answering device, as shown in FIG. 1, comprises an answering endless tape T-1. In the first portion, defined by the points $a$ and $b$, of this answering tape T-1, an answering term to be sent to a calling party first, such as "Hello, this is Hashimoto Corporation. Who is this, please?" (hereinafter referred to as an answering term or an answering signal $T_{1-1}$ when applicable) has been recorded in advance. The second portion, defined by the points $b$ and $c$ in FIG. 1, of the tape T-1 is a so-called "blank" portion where no answering term is recorded. The "blank" portion is provided for permitting a calling party to talk over the phone, which will become more apparent later.

In the second portion, there is provided an actuator P-1 which in this example is made of an electrically conductive foil in order to actuate a timer circuit TM by short-circuiting electrodes CP-1 and CP-2. The function of the actuator P-1 may be achieved also by the utilization of a control signal recorded in the tape or of the optical action of a transparent portion provided in the tape T-1.

In the last portion, defined by the points $e$ and $f$ in FIG. 1, of the tape T-1, there is provided another actuator P-2 near the point $f$, which will shortcircuit electrodes CP-3 and CP-4 as the tape makes one turn, to suspend the operation of the automatic telephone answering device.

The automatic telephone answering device further comprises a ring circuit RC connected to telephone lines $L_1$ and $L_2$, and a relay A which is operated by the ringing circuit RC and self-held by a contact a-1 and a protective resistor R to make the closed loop circuit (not shown) of the telephone lines, and an electric motor M which is operated by the contact a-1 of the relay A.

An amplifier AMP-1 is provided for amplifying the signal recorded in the endless tape T-1, and is operated when the relay A is energized. More specifically, the signal recorded in the tape T-1 is applied through a reproducing head RPH to the amplifier AMP-1, the output of which is delivered to the telephone lines.

The automatic telephone answering device according to the invention further comprises a loudspeaker circuit comprising an amplifier AMP-2, a relay B, and a loudspeaker SP. The amplifier AMP-2 is energized also when the relay A is energized, but the output of the amplifier AMP-2 is still opened by a contact b-1 of the relay B to the loudspeaker SP. The relay B is so designed that it is operated for 3 – 4 seconds by the timer circuit TM which is energized by the shortcircuiting of the electrodes CP-1 and CP-2, and is released in the 3 – 4 second period. The period of time set by the timer circuit is obtained by adjusting and fixing the time constant of the timer circuit to the period of time corresponding to the pause interval or blank portion of the tape. However, it should be noted that the period of time set by the timer circuit TM is, in this example, 3 – 4 seconds shorter than the period of time (5 – 6 seconds) corresponding to the blank portion so that the former is certainly included in the latter. Furthermore, it is believed that 3 – 4 seconds is long enough to say the name of a calling party.

The operation of the automatic telephone answering device will now be described. Upon arrival of a calling signal (of 16 Hz) over the telephone lines $L_1$ and $L_2$, the calling signal is amplified and rectified by the ringing circuit RC, whereby the relay A is actuated. As a result, the motor M is operated by the contact a-1 of the relay A, and the answering endless tape T-1 is driven. Therefore, the answering signal $T_{1-1}$ recorded on tape in advance is detected by the reproducing magnetic head RPH and is then amplified by the amplifier AMP-1. The answering signal thus amplified is transmitted to the telephone lines. At the same time, the amplifier AMP-2 is also operated, but its output is not applied to the loudspeaker SP yet, because the contact b-1 of the relay B is kept open.

However, as the endless tape T-1 moves on, the actuator P-1 shorts the electrodes CP-1 and CP-2. As a result, the timer circuit TM is actuated to operate for a predetermined period of time 3 – 4 second, and the relay B is energized to cause its contact b-1 to make for the same period of time, so that the input signal of the amplifier AMP-2 can be amplified through the loudspeaker SP for that period of time.

If under this condition a calling party answers to the answering term "Hello . . . Who is this, please?," his voice is delivered through the telephone lines to the amplifier AMP-2 (IN) and is finally reproduced by the loud speaker SP. However, it should be noted that the period of time during which his voice is reproduced by the loud speaker SP is limited to the period of time during which the relay B is kept energized by the operation of the timer TM. This period of time is set to several seconds in advance, that is, a period of time suitable for the calling party to say his name-in responsive to the answering term $T_{1-1}$ "Hello, . . . Who is this, please?" is adjusted and fixed in the timer TM in advance. Accordingly, when the period of time thus set in the timer TM has passed, the relay B is de-energized to break the contact b-1 as shown in FIG. 1, and his voice is no longer reproduced by the loudspeaker. The reproduction of his voice is effected within the period of time corresponding to the second portion b-c of the endless tape T-1.

In the third portion c-d of the endless tape T-1, another answering term $T_{1-2}$ such as, "Sorry, we cannot answer you because this office is closed for today. Please call us back tomorrow," has been also recorded in advance. Therefore, when the predetermined period of time described above has passed, that is, when the point c of the endless tape reaches the reproducing magnetic head RPH, the answering term $T_{1-2}$ is detected by the reproducing magnetic head and amplified by the amplifier AMP-1, and the answering term $T_{1-2}$ thus amplified is transmitted through the telephone lines to the caller. The answering term $T_{1-2}$ is not limited to that described above, and there may be added to it: "This office will be opened at 9 o'clock tomorrow. Please call us back at 9:30," or a similar message.

In the case where an answering term such as "We should like to record your message," as described before, has been recorded in the endless tape of the telephone answering device of this invention, the voice of the calling party can be recorded by means of a tape recorded combined with telephone answering device.

Finally, the actuator P-2 provided at the point f of the endless tape T-1 operates to short-circuit the electrodes CP-3 and CP-4, as a result of which the relay A is de-energized by grounding it through the contact electrodes CP-3 and CP-4, and the contact a-1 is opened to stop the motor M. Then the movement of the endless tape is suspended, and finally the whole device is restored.

Summarizing the above, heretofore the answering tape T-1 of an ordinary telephone answering device has been used for producing the answering terms; however, according to the invention the actuator is provided in the blank portion of the tape which is located after the first portion a-b of the tape, where the first answering term has been recorded. The actuator operates the timer circuit TM and accordingly the relay B, thereby connecting the output of the amplifier AMP-2 to the loudspeaker SP for a predetermined period of time of the timer circuit TM, so that for the same period of time the voice of a calling party may be reproduced by the loudspeaker.

In the case where the present invention is applied to a telephone set which may ring in a quiet room at night when a person is in bed, the ringing circuit should be adjusted so that the automatic telephone answering device is operated by only one ring of the telephone, then the device becomes operative and the answering term $T_{1-1}$ is transmitted to the calling party. In this case, the person in the vicinity of the telephone set may hear the one ring, but never hears the answering term through the loudspeaker. Very soon, he may hear the voice of the calling party through the loudspeaker during the period of time fixed in the timer and simultaneously recognize who the calling party is. If it is necessary for him to answer it, he should pick up the handset before the endless tape makes one turn. If it is unnecessary to do so, however, he may leave the automatic telephone answering device as it is. When the endless tape has made one turn, the automatic telephone answering device is restored to a stand-by situation. Even if the calling party tries calling the telephone answering device many times, the results will be the same unless the called party picks up the hand set.

Since in this invention the telephone answering device and the telephone set are connected in parallel, upon arrival of a calling signal first the telephone set rings one or two times, and then the telephone answering device becomes operable. However, in the case of the above-described Japanese Pat. No. 532850, the voice of a calling party and the voice of a called party both are kept reproduced through the loudspeaker for the period during which the telephone answering device is operated. This is disturbing to anyone near the loudspeaker. In this respect, the device of the Japanese Pat. No. 532850 is not practical.

On the other hand, in this invention the voice of a calling party is reproduced by the loudspeaker for only 3 – 4 seconds; that is, in this respect the invention is much more practical in use than the above-mentioned Japanese Patent. However, sometimes, only one or two rings of the telephone set described before might be noisy for someone sleeping or working. This problem can be solved by re-installing only the telephone set TEL on the same telephone lines at a place where such ringing does not bother anybody and by connecting only the telephone answering device to the telephone lines. This method is practical because there is a tendency for the rooms in a building to individually have a telephone jack or jacks into which telephone sets can be instantly plugged.

Figure 2:
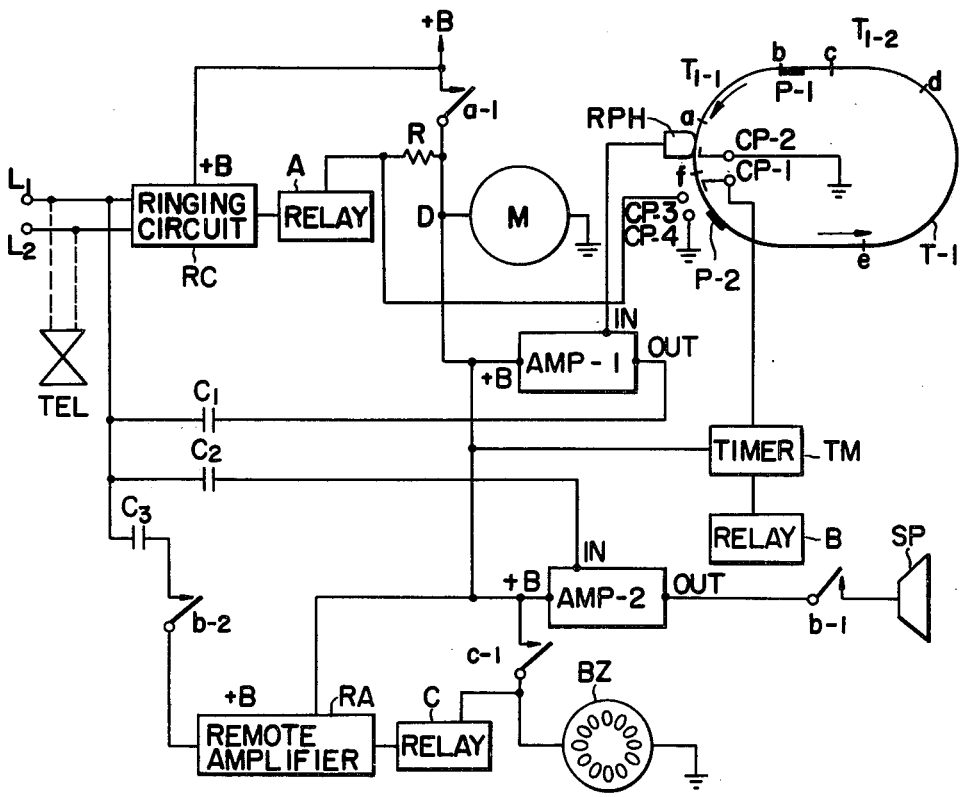

In order to add another function to the automatic telephone answering device, a special circuit is added as is shown in FIG. 2. This special circuit is a notifying circuit which comprises a remote amplifier RA, a relay C, and a buzzer BZ for producing a notifying sound.

The remote amplifier RA is so designated as to be operated by a particular signal transmitted by a calling party, and incorporates an element such as a micro-fork or a filter circuit operating with the aid of a certain frequency, thereby operating the relay C, which in turn operates the buzzer BZ. In the notifying circuit thus organized, when the relay C is actuated by the remote amplifier RA, it is self-held by the contact $c$-1 until the answering endless tape completes its one turn, that is, the buzzer BZ continues to produce a notifying sound, or to buzz, for the period of time corresponding to one turn of the endless tape.

The electrical source of the special circuit is the same as that of the electric motor M. Therefore, when the relay A is de-energized, the relay C is released.

As was described, the remote amplifier RA is operated with the aid of the particular signal transmitted by the calling party. The particular signal is transmitted by dialing a certain number from a telephone set or by the use of a portable type signal oscillator carried by the calling party. The transmission of the particular signal must be completed within several seconds after the actuator P-1 has short-circuited the electrodes CP-1 and CP-2. The introduction of the particular signal transmitted by the calling party into the remote amplifier RA is effected through a contact $b$-2 of the relay B when the relay B has been operated by the timer circuit TM, or when the first answering term $T_{1-1}$ "Hello . . . Who is this, please?" has been sent to the caller. As a result, the relay C is operated and is self-held by the contact $c$-1, and the buzzer BZ is also operated.

Since a remote amplifier such as described above is well known in the art of telephone answering devices, the detailed description thereof will be omitted.

The buzzer may be substituted by a chime or a tone ringer.

It is advisable to employ the second example of the invention in a considerably roomy house in the daytime. For instance, if the buzzer BZ is installed at several places in the roomy house, a person in the house can know of a telephone call no matter where he is even if he is in a bath room. Since the buzzers are operated by the particular signal, as described above, it is apparent that the call is made by the particular person transmitting the particular signal. There is no waste of time, getting to the telephone set. Thus, the telephone set equipped with the telephone answering device according to the invention is more advantageous for the subscriber than that without the answering device of the invention, because a subscriber not having a telephone answering device such as that of the invention will have to run about in confusion, answering unwanted telephone calls no knowning who the calling parties are. His privacy is considerably distrubed by, unwanted telephone calls.

As is apparent from the above description, according to this invention, after recognizing who a calling party is, the subscriber can pick up the handset to talk with him, that is, the automatic telephone answering device according to the invention is advantageous in that it can notify the subscriber of a telephone call for which he wants to pick up the hand set, that is, he can select whether or not the telephone call should be answered by him. Accordingly, his privacy will not be disturbed by unwanted telephone calls which leads to more effective use of his time.

Furthermore, since the voice of a calling party is reproduced through the loudspeaker for only 3 – 4 seconds, nobody sleeping or working in the vicinity of the loudspeaker is disturbed. In addition, as one of the merits of this invention an external tape recorder may be added to the telephone answering device to record the message of a calling party.

It should be noted that the period of time set by the timer TM is shorter than the pause interval (bc), and the period of time set by the timer circuit can be adjusted and fixed as required, as described before.

Furthermore, the invention has been described based on the fact that the period of time (3 – 4 seconds) set by the timer circuit TM is less than that (5 – 6 seconds) of the pause interval or blank portion. The relationship established between these two periods of time may be simplified by the following method. That is, a normally-closed contact $b$-3, as illustrated, is provided between the circuit point D and the motor M in such a manner that the contact $b$-3 is kept opened while the relay B is energized, thereby stopping the energization of the motor M, and the motor is driven again when the timer circuit is released. In this method, it is unnecessary for the blank portion of the tape to have that length $b$–$c$ (at least 25 cm), that is, the length $b$–$c$ may be shortened to about 1 cm which is sufficient for the provision of the actuator P-1, and the pause interval is equal to the period of time set by the timer circuit.

In addition, in this method, the number of the contacts of the relay B is increased by one, and it is necessary to provide an additional means for continuously driving the motor M when the outgoing message is recorded on the portion T-1 of the tape.

In the examples described above, a magnetic tape is employed as a sound recording medium; however, it may be replaced by a sound recording means such as a magnetic disk or the like. In addition, it is obvious to those skilled in the art that any other components of the telephone answering device according to this invention may be changed or modified without departing from the spirit of this invention.

I claim:

1. An automatic telephone answering device operating upon arrival of a calling signal, comprising an answering endless magnetic tape in which answering terms have been prerecorded with a pause interval to provide a blank portion therein so as to allow a calling party to talk for the pause interval, and loudspeaker means for reproducing the voice of the calling party, said device comprising:
    a. actuating means fixedly located at the start point of said blank portion of said tape;
    b. timer means between said tape and said loudspeaker means, said timer means being preset to make said loudspeaker means operable for a period of time shorter than the pause interval upon energization;
    c. pickup means connected to said timer means and disposed to cooperate with said tape for energizing said timer means in cooperation with said actuating means, said pickup means being operated by said actuating means as said tape is moved on to energize said timer means,
    whereby the voice of the calling party is audifly reproduced during a period of time less than said pause interval.

2. A device as claimed in claim 1, wherein said loudspeaker means comprises:
    a. an amplifier for amplifying the voice of a calling party,
    b. a loudspeaker connected through contact means to said amplifier, for reproducing the voice of the calling party, and
    c. first relay means including said contact means and connected to said timer means, said first relay means being, upon energization of said timer means, operated to actuate said contact means to allow the voice of the calling party to be transmitted through said amplifier to said loudspeaker,
    whereby the voice of the calling party is reproduced through said loudspeaker.

3. A device as claimed in claim 1 including:
    a. a remote amplifier connected to telephone lines and controlled by said timer means, said remote amplifier having a filter circuit which becomes operable by a predetermined frequency transmitted over said telephone lines by a calling party to allow said remote amplifier to produce an output;
    b. second relay means connected to said remote amplifier, said second relay means being actuated by said output of said remote amplifier so as to be self-held until said tape makes one turn; and
    c. means connected to said second relay means for producing a notifying sound to be recognized by a called party and made operable by actuation of said second relay means to produce said notifying sound until said tape makes one turn.

4. A device as claimed in claim 3, wherein said means for producing the notifying sound is a buzzer.

5. A device as claimed in claim 3, wherein said means for producing the notifying sound is a tone ringer.

6. A device as claimed in claim 3, wherein said means for producing the notifying sound is a chime.

7. An automatic telephone answering device operating upon arrival of a calling signal, comprising an answering endless tape driven by an electric motor, wherein first and second answering terms have been recorded, said device comprising:
    a. first actuating means provided between two portions of said answering endless tape where said first and second answering terms have been recorded, in such a manner that said first answering term, actuating means and second answering term are successively provided in sequential order;
    b. timer means energized when pickup means connected thereto detects said actuating means, said timer means being preset to have a set period of time of substantially 3 to 4 seconds;
    c. relay means actuated by said timer means;
    d. amplifier means energized through said relay means so that loudspeaker means reproduces the voice of a calling party;
    e. means for deenergizing said motor upon actuation of said relay means to suspend the running of said endless answering tape, and for energizing said motor again after the lapse of said set period of time to drive said endless answering tape to allow the second answering term to be transmitted to the calling party; and
    f. means for restoring said automatic telephone answering device in its entirety by deenergizing relay means, which has formed a closed loop since the arrival of the calling signal, by operating pickup means with second actuating means provided at the last portion of said endless answering tape,
    whereby the voice of the calling party is reproduced through the loudspeaker means during the period of time set by said timer means after the first answering term has been transmitted to the calling party.

8. A device as claimed in claim 7, wherein both said actuating means are made of metal foil.

9. A device as claimed in claim 7, wherein said actuating means is a signal recorded in said endless answering tape to actuate said timer means through said pickup means,
    whereby a calling party can record said first answering term as long as required.

10. A device as claimed in claim 9, wherein said signal recorded as the actuating means is a beep tone.

* * * * *

UNITED STATES PATENT OFFICE
CERTIFICATE OF CORRECTION

Patent No. 4,069,397                    Dated January 17, 1978

Inventor(s)  Kazuo Hashimoto

It is certified that error appears in the above-identified patent and that said Letters Patent are hereby corrected as shown below:

On The Title Page insert:

-- [30] Foreign Application Priority Data

March 25, 1975        Japan        50-36401  --.

Signed and Sealed this

Thirteenth Day of June 1978

[SEAL]

Attest:

RUTH C. MASON
Attesting Officer

DONALD W. BANNER
Commissioner of Patents and Trademarks